(12) United States Patent
Duic et al.

(10) Patent No.: US 11,761,852 B2
(45) Date of Patent: Sep. 19, 2023

(54) ROTARY TORQUE INPUT FIXTURE FOR TESTING A SOLID AXLE IN A ROAD SIMULATION TEST

(71) Applicants: Jeffrey Duic, Tecumseh (CA); Dan Pereira, Lasalle (CA); Dan Pannunzio, Kingsville (CA); Steven Fabischek, Windsor (CA)

(72) Inventors: Jeffrey Duic, Tecumseh (CA); Dan Pereira, Lasalle (CA); Dan Pannunzio, Kingsville (CA); Steven Fabischek, Windsor (CA)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 17/513,389

(22) Filed: Oct. 28, 2021

(65) Prior Publication Data

US 2023/0133284 A1 May 4, 2023

(51) Int. Cl.
*G01M 13/025* (2019.01)
(52) U.S. Cl.
CPC ................................. *G01M 13/025* (2013.01)
(58) Field of Classification Search
CPC .................................................... G01M 13/025
See application file for complete search history.

(56) References Cited

U.S. PATENT DOCUMENTS

| | | | |
|---|---|---|---|
| 4,263,809 A | 4/1981 | Petersen et al. | |
| 4,499,759 A * | 2/1985 | Hull | G01M 17/022 73/146 |
| 4,898,026 A * | 2/1990 | Damitz | G01M 13/026 73/116.01 |
| 4,951,504 A * | 8/1990 | Klock | G01M 17/04 73/115.07 |
| 6,241,616 B1 * | 6/2001 | Lightcap | F16C 3/03 464/158 |
| 6,389,888 B1 * | 5/2002 | Juranitch | G01M 13/028 73/116.01 |
| 2008/0190183 A1 * | 8/2008 | Erlach | G01M 15/044 73/862.08 |
| 2008/0275682 A1 | 11/2008 | Langer | |
| 2016/0123376 A1 * | 5/2016 | Buschbeck | F16C 3/026 464/181 |
| 2016/0282225 A1 * | 9/2016 | Teramoto | G01M 13/045 |
| 2017/0242447 A1 * | 8/2017 | Vik | E02F 9/02 |
| 2020/0232879 A1 * | 7/2020 | Korzuschnik | G01M 13/027 |

* cited by examiner

Primary Examiner — Eric S. McCall
(74) Attorney, Agent, or Firm — Jeremy J. Klobucar

(57) ABSTRACT

A road simulation test system and method for testing torsional strain input to an axle assembly having an input shaft and a suspension system, including a torque input module configured to apply rotary torque to the axle assembly. The torque input module includes a rotary actuator, a torsional load cell, a drive shaft connection portion, and a controller in communication with the rotary actuator and the torsional load cell, wherein upon receipt of an instruction from the controller, the rotary actuator is configured to rotate the input shaft to apply the rotary torque to the axle assembly, and as the rotary actuator rotates the input shaft, a signal indicative of a torsional load is communicated by the torsional load cell to the controller to monitor the rotary torque applied to the axle assembly.

15 Claims, 5 Drawing Sheets

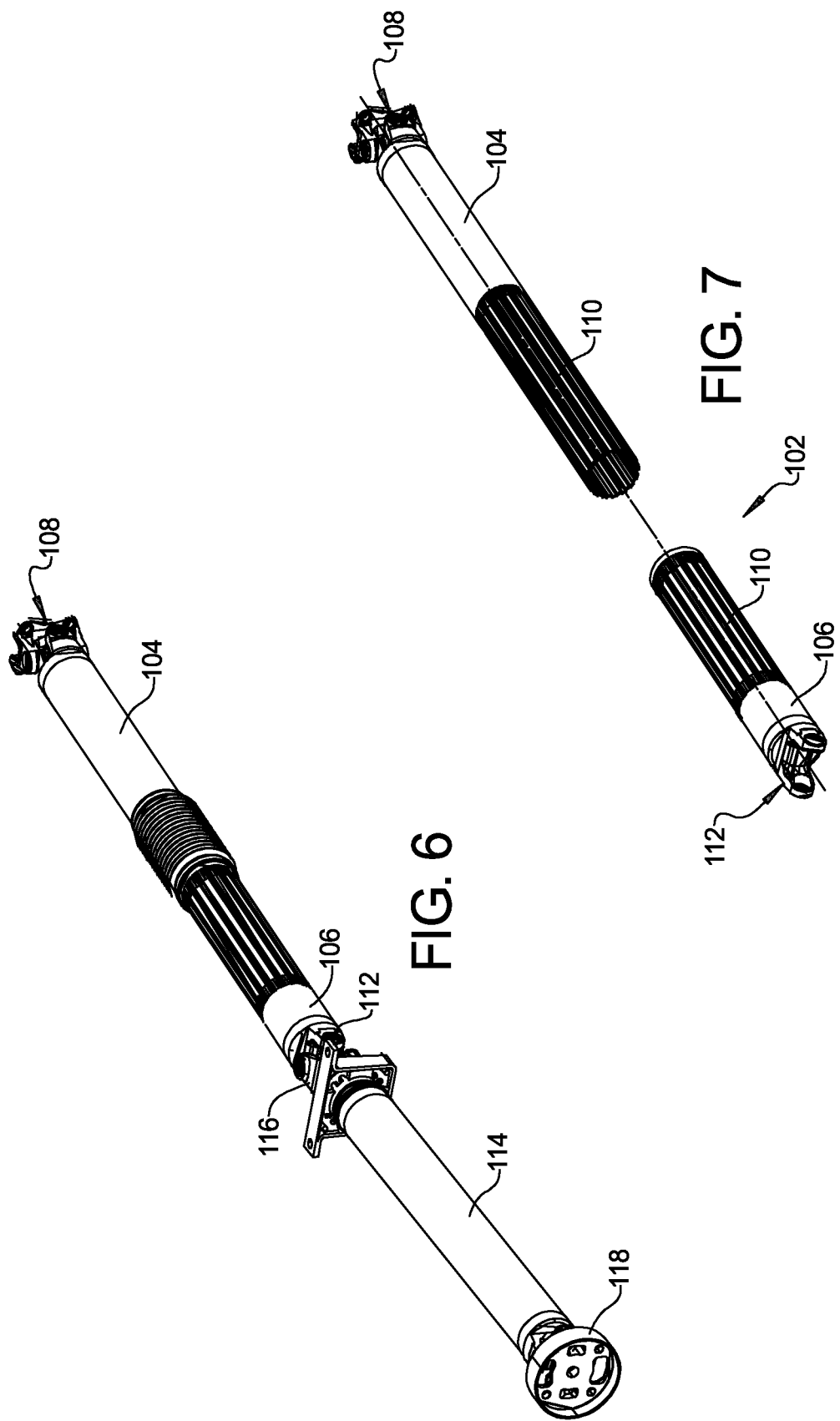

ROTARY TORQUE INPUT FIXTURE FOR TESTING A SOLID AXLE IN A ROAD SIMULATION TEST

FIELD

The present disclosure relates a rotary torque input fixture for testing a solid axle during a road simulation test.

BACKGROUND

When a vehicle with a solid axle suspension undergoes an acceleration event on the road, a phenomenon within the axle commonly known as axle windup occurs. Axle windup produces a torsional strain within the axle tubes, along with loads in other components of the suspension such as control arms and leaf springs. During a road test simulation, engineers seek to reproduce these loads, including axle windup, in a lab environment. In this regard, during the road test simulation, inputs are applied to the suspension to move it in such a way that the same forces and displacement as measured on the road are fully reproduced in the lab in a controlled environment.

Currently, in order to reproduce axle windup during the road test simulation, the axle must be attached to a fixture with adapters that may require the axle to be modified before testing. For example, in order to fit the adapters that attach the axle to the fixture, the differential cover and ring gear of the axle may require removal. This is undesirable in that removal of these components from the axle can affect the mechanical properties of the axle and, therefore, affect the validity of the road test simulation.

In addition, the mechanism that applies torque to the axle adds un-sprung mass to the axle assembly, which can create unwanted inertial loads into the axle that can adversely affect the test results. More particularly, a linear actuator is currently used to input torque to the axle. The linear actuator moves a pair of arms that attached to opposing sides of the axle in equal and opposite directions to convert the linear motion to torsional motion. Unfortunately, the manner in which the pair of arms are connected to the axle result in a load path that does not match what is experienced during real time driving conditions, which can introduce a source of error into the test results.

SUMMARY

According to a first aspect of the present disclosure, there is provided a road simulation test system for testing torsional strain input to an axle assembly having an input shaft and a suspension system. The test system includes a torque input module configured to apply rotary torque to the axle assembly. The torque input module includes a rotary actuator, a torsional load cell, a drive shaft connection portion, and a controller in communication with the rotary actuator and the torsional load cell, wherein upon receipt of an instruction from the controller, the rotary actuator is configured to rotate the input shaft to apply the rotary torque to the axle assembly, and as the rotary actuator rotates the input shaft, a signal indicative of a torsional load is communicated by the torsional load cell to the controller to monitor the rotary torque applied to the axle assembly.

According to the first aspect, the torque input module further includes an angular displacement transducer attached to the rotary actuator and in communication with the controller, wherein the angular displacement transducer is configured to transmit a signal indicative of an angular displacement applied to the input shaft of the axle assembly.

According to the first aspect, the drive shaft connection portion includes a drive shaft having a proximate end attached to the rotary actuator, and a distal end attached to the input shaft of the axle assembly.

According to the first aspect, the drive shaft includes a first section attached to the rotary actuator and a second section attached to the input shaft, wherein the first section and second section are telescopically movable relative to each other.

According to the first aspect, the first section and second sections each include a plurality of axially extending splines that are configured to mate with each other to ensure rotation of the drive shaft when the first and second sections are mated to each other.

According to the first aspect, the rotary actuator includes a spindle that is attached to a recess formed in a first end of the torsional load cell that is configured for receipt of the spindle, and the first section of the drive shaft is attached a second end of the torsional load cell.

According to the first aspect, the test system also includes a support structure for supporting the axle assembly and the torque input module.

According to the first aspect, the support structure includes a pair of stanchions that support a backbone, and the axle assembly and the torque input module are attached to the backbone.

According to the first aspect, the support structure includes support jig that attaches the axle assembly to the backbone, wherein the support jig includes a plurality of couplings that attach components of the suspension system to the support jig.

According to the first aspect, the support structure includes a support truss that attaches the torque input module to the backbone.

According to the first aspect, the torque input module is attached to a mounting frame that is attached to the support truss.

According to a second aspect of the present disclosure, there is provided a method for testing torsional strain input to an axle assembly having an input shaft and a suspension system. The method includes applying rotary torque to the axle assembly using a torque input module including a rotary actuator, a torsional load cell, and a drive shaft connection portion, wherein the rotary actuator rotates the input shaft to apply the rotary torque to the axle assembly; and monitoring a torsional load applied to the axle assembly with the torsional load cell.

According to the second aspect, the method also includes monitoring an angular displacement applied to the input shaft of the axle assembly using an angular displacement transducer that is part of the torque input module.

According to the second aspect, the drive shaft connection portion includes a drive shaft having a proximate end attached to the rotary actuator, and a distal end attached to the input shaft of the axle assembly.

According to the second aspect, the drive shaft includes a first section attached to the rotary actuator and a second section attached to the input shaft, wherein the first section and the second section are telescopically movable relative to each other.

According to the second aspect, the first section and second section each include a plurality of axially extending splines that are configured to mate with each other to ensure rotation of the drive shaft when the first and second sections are mated to each other.

According to the second aspect, the method also includes attaching the axle assembly and the torque input module to a support structure.

According to the second aspect, the support structure includes support jig that attaches the axle assembly to the backbone, and the method further comprises attaching components of the suspension system to the support jig.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 6 and 7 illustrate a drive shaft of the torque input module illustrated in FIG. 1.

DETAILED DESCRIPTION

Figure 1:
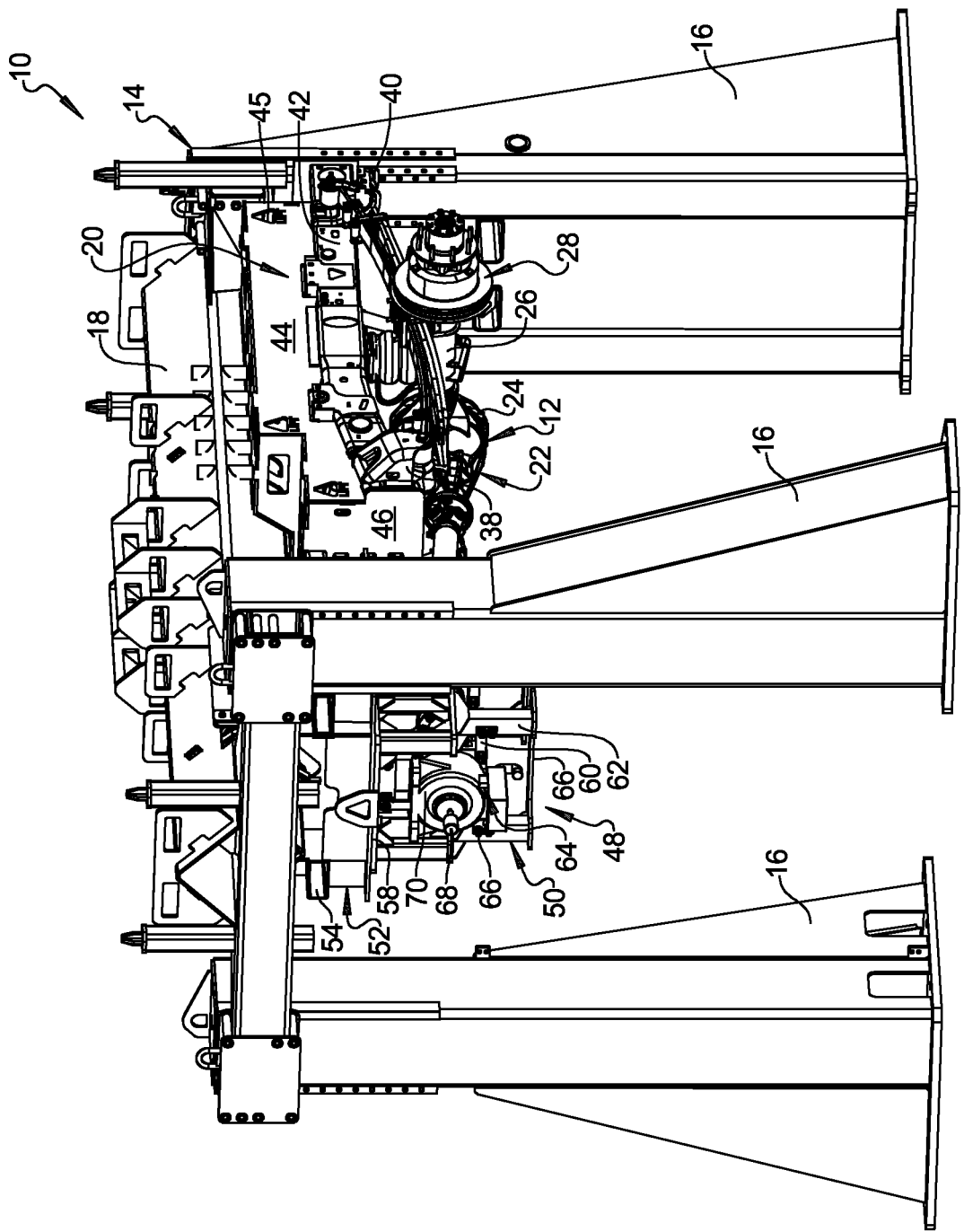
FIG. 1 is an isometric perspective view of a testing system for inputting a rotary torque to an axle assembly according to a principle of the present disclosure.
Figure 2:
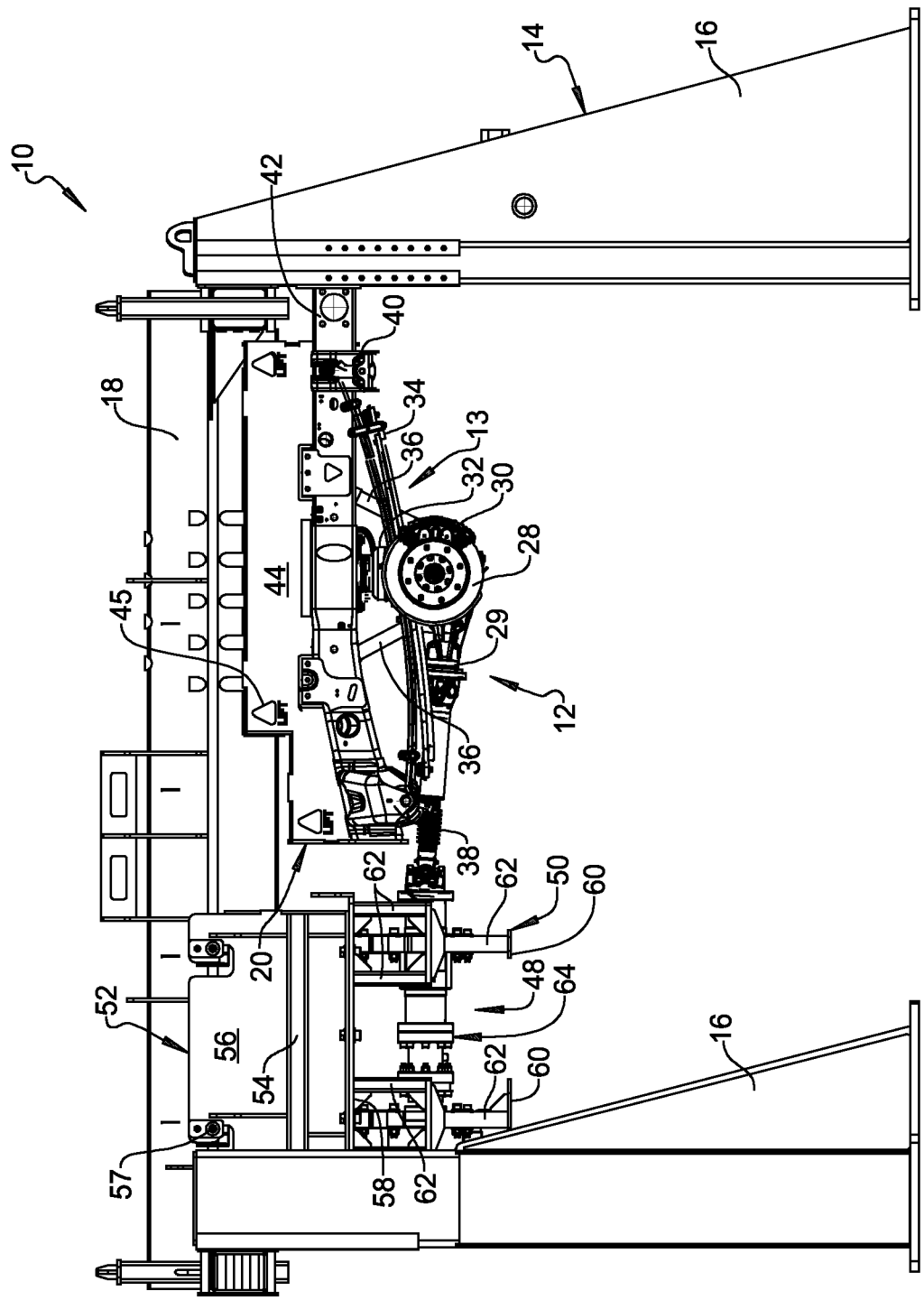
FIG. 2 is a side perspective view of the testing system illustrated in FIG. 1.
Figure 3:
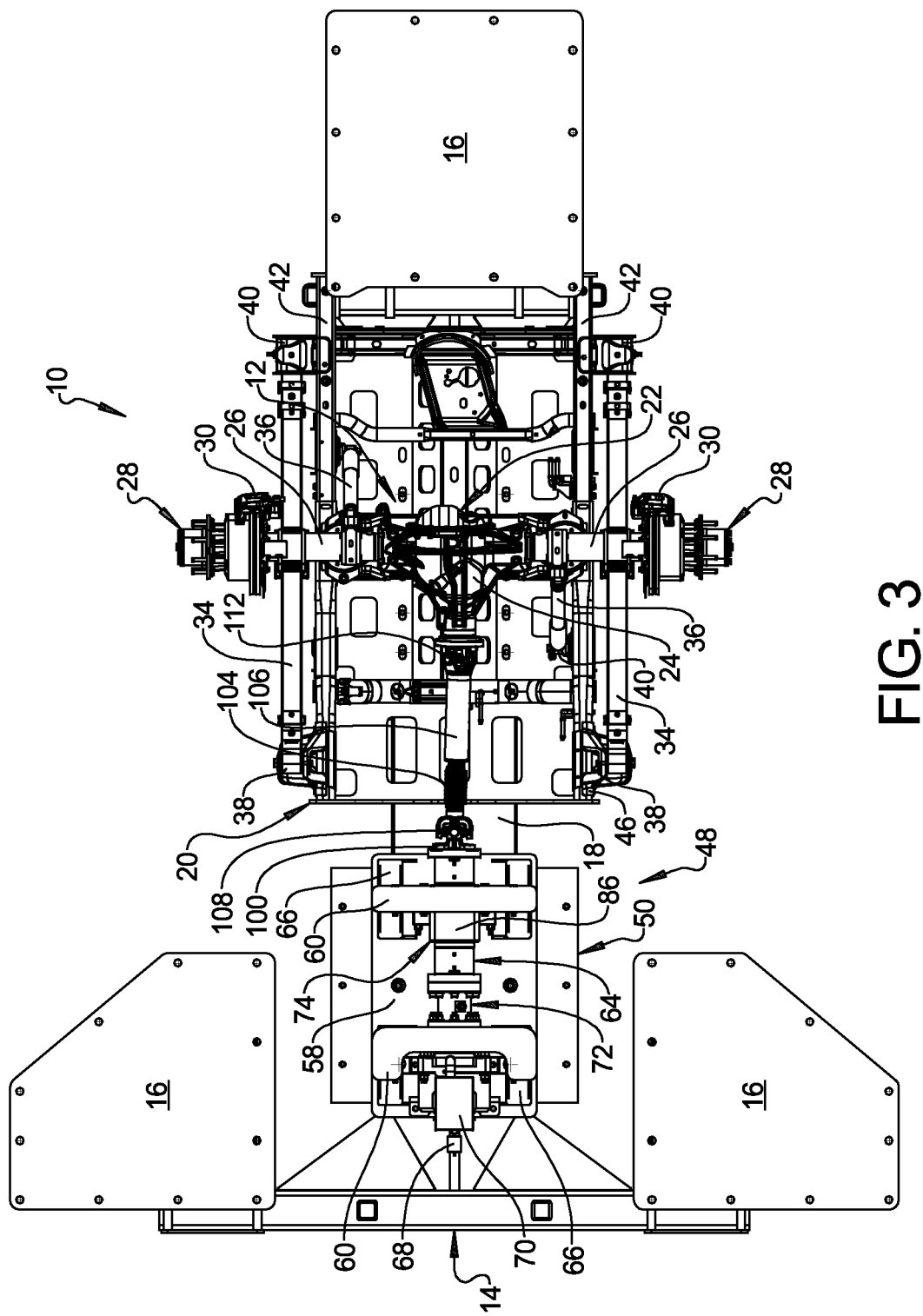
FIG. 3 is a bottom perspective view of the testing system illustrated in FIG. 1.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

FIGS. 1-5 illustrate a testing system 10 for inputting a rotary torque to an axle assembly 12 according to a principle of the present disclosure. System 10 includes a support structure 14 including a plurality of stanchions 16 that support a backbone 18 that is fixed to stanchions 16, and configured to suspend and support axle assembly 12 during torsional testing thereof. Support structure 14 also includes a support jig 20 that is configured to attach axle assembly 12 to backbone 18, and configured for attachment to various features of axle assembly 12. Stanchions 16 and jig 20 may be formed of rigid materials such as steel, aluminum, or some other type of rigid material that are configured to support and suspend axle assembly 12.

Axle assembly 12 includes an axle 22 including a differential housing 24 that houses various gears (not illustrated), a pair of axle tubes 26 that each have a hub 28 and brake assembly 30 attached to the differential housing 24, and an input shaft (of which only a input shaft coupling 29 is illustrated) that is attached to the gears within differential housing 24. In addition, axle assembly 12 includes a suspension system 13 including, but not limited to, a pair of coil springs 32, a pair of leaf spring assemblies 34, and a pair of dampers 36. In a vehicle, the coil springs 32, leaf spring assemblies 34, and dampers 36 are each attached to the axle 22 and also attached to a vehicle frame (not illustrated) or body (not illustrated). Inasmuch as axle assembly 12 is not part of a vehicle while located in test system 10, support jig 20 includes various flanges 38 and couplings 40 that are shaped and configured like those found in a vehicle for connecting to coil springs 32, leaf spring assemblies 34, and dampers 36 such that when axle assembly 12 is being tested, these features will function in the same manner as when part of a vehicle.

Support jig 20 may be fixed to backbone 18, or translatable along a length of backbone 18. In either case, support jig 20 includes a pair of rails 42 that extend along and are configured to be connected to backbone 18 by mounting fixtures 44. Rails 42 are connected to each other by a pair of plates 46. Fixtures 44 may include apertures 45 formed therein to permit jig 20 and axle assembly 12 to be lifted and attached to backbone 18 using a crane, winch, or some other type of lifting device (not shown). Rails 42 function in a manner similar to a vehicle frame (not shown), and include the above-noted flanges 38 and couplings 40 for attaching axle assembly 12 thereto.

System 10 also includes, in accordance with a principle of the present disclosure, a rotary torque input module 48. Module 48 includes a mounting frame 50 that is configured to be attached and detached from a support truss 52. Support truss 52 includes a pair of beams 54 that extend along backbone 18. Beams 54 are each coupled to a corresponding upstanding support plate 56 that extends in parallel with beams 54, and is configured to be attached to backbone 18 using fasteners 57. A mounting plate 58 is connected to and extends between the upstanding support plates 56, which is configured to connected to mounting frame 50 by welding or some other attachment mechanism.

Mounting frame 50 includes a pair of planar support members 60. A plurality of support girders 62 extend upward form planar support members 60 that are attached to mounting plate 58. Support girders 62 support a rotary torque input assembly 64 that is configured to connect to input shaft coupling 29 of axle assembly 12. Rotary torque input assembly 64 is connected to support girders 62 using fasteners 66 or some other type of attachment mechanism.

Figure 4:
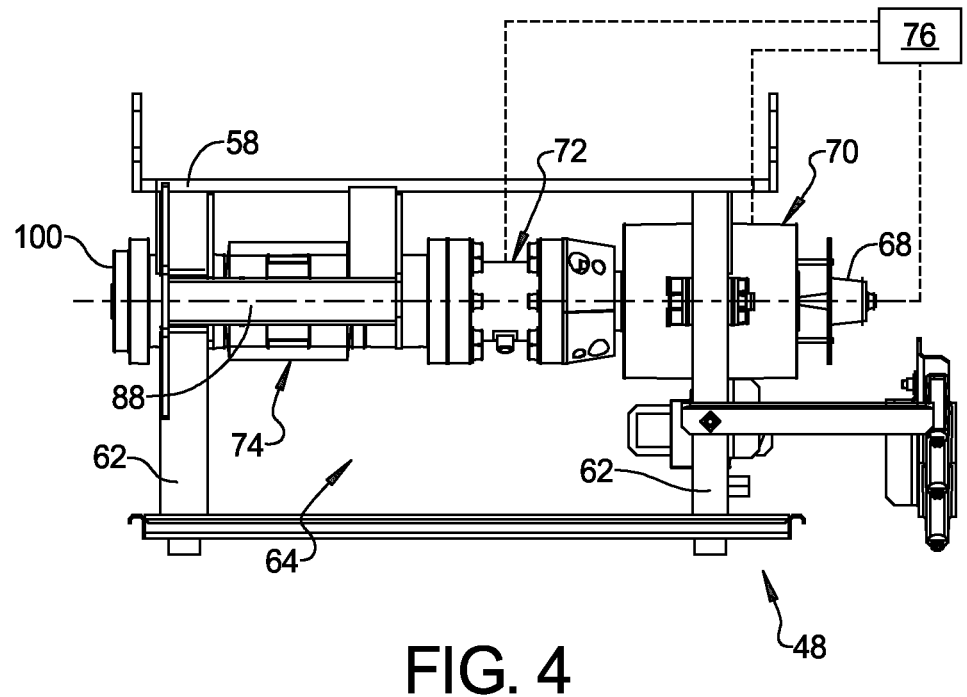
FIG. 4 is a perspective view of a torque input module that is part of the testing system illustrated in FIG. 1.
Figure 5:
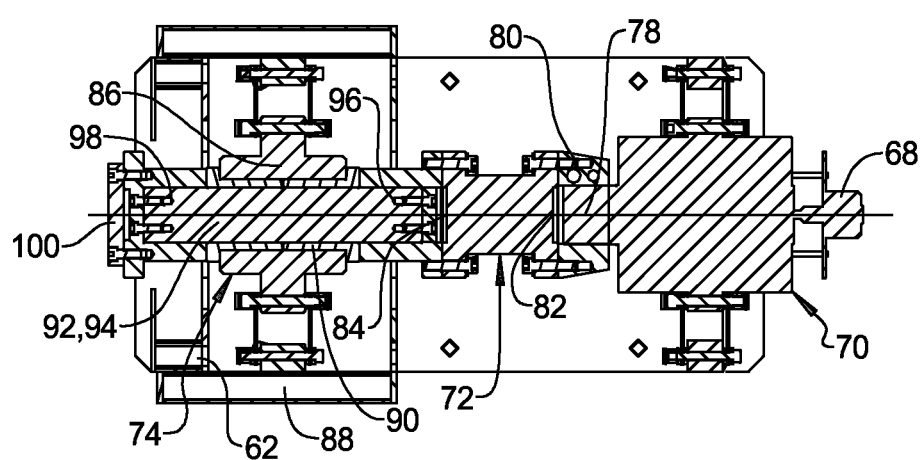
FIG. 5 is a cross-sectional view of the torque input module along line 5-5 of FIG. 4.

As best shown in FIGS. 4 and 5, rotary torque input assembly 64 includes an angular displacement transducer 68, a rotary actuator 70, a torsional load cell 72, drive shaft connection portion 74, and controller 76. Rotary actuator 70 may any type of actuator known to one skilled in the art, including hydraulic actuators and electric actuators. Rotary actuator 70 is controlled by controller 76, and is configured to rotate drive shaft connection portion 74, which in turn rotates input shaft 28 that is attached to differential 24. Angular displacement transducer 68 and torsional load cell 72 communicate with controller 76. Thus, as rotary actuator 70 rotates drive shaft connection portion 74 and input shaft 28, signals that are indicative of the angular displacement of input shaft 28 and the torsional load experienced by axle assembly 12 may be communicated by angular displacement transducer 68 and torsional load cell 72, respectively, to controller 76 to monitor the rotational torque applied to axle assembly 12 by input assembly 64.

As best shown in FIG. 5, rotary actuator 70 includes a spindle 78 that is connected to torsional load cell 72. In this regard, load cell 72 includes a first end 80 having a recess 82 configured for receipt of spindle 78 and an opposite second end 84 that is configured for connection with drive shaft connection portion 74. Drive shaft connection portion 74 includes a housing 86 that is fixed to side beams 88 that are fixed to support girders 62. Housing 86 additionally includes a sleeve 90 that acts as a bearing surface for a first section 92 of a drive shaft 94 rotatably supported within housing 86. First section 92 of drive shaft 94 includes a proximate end 96 connected to second end 84 of load cell 72 and a distal end 98 having a coupling 100 that extends outward from housing 86 in a direction toward input shaft 28 of axle assembly 12.

Referring to FIGS. 6 and 7, a second section 102 of drive shaft 94 is illustrated. Second section 102 is a two-piece structure including an input end 104 and an output end 106, where output end 106 is capable of telescopically moving relative to input end 104 for jounce and rebound purposes during testing. Input end 104 includes a first universal joint 108 configured to attach to coupling 100 of first section 92. Input and output ends 104 and 106 are each cylindrical tubes having a plurality of axially extending splines 110 that are configured to mate with each outer to ensure rotation thereof when mated to each other. Output end 106 includes a second universal joint 112 that is configured to connect to input shaft coupling 29. While not required by the present disclosure, it should be noted that if second section 102 is not long enough to reach input shaft coupling 29 attached to axle assembly 12, an extension shaft 114 may be used that couples output end 106 to input shaft coupling 29. In this regard, extension shaft 114 may include a third universal joint 116 that attaches to second universal joint 112 and a coupling 118 that is configured to mate with input shaft coupling 29.

Upon receipt of an instruction received from controller 76, actuator 70 will rotate load cell 72, drive shaft 94, and input coupling 29 to drive the gears (not illustrated) within axle assembly 12. Thus, rotary torque input assembly 64 inputs torsional loads into axle assembly 12 through an axle pinion (not shown) of the axle assembly 12 connected to input coupling 29, in a similar manner as would occur in a vehicle. As a result, no modifications need to be made to axle assembly 12 to test the axle assembly 12 (i.e., the differential cover and ring gear of the axle do not need to be removed), and the torsional load that is applied to the axle assembly 12 may match what is experienced during real time driving conditions such that no sources of error are introduced into the test results like when a linear actuator is used.

It is important to note that the input assembly 64 does not spin the axle assembly 12 in a manner like what would occur while driving. Rather, the torsional loads applied by input assembly 64 are input in a semi-static state. This is because the hubs 28 of axle assembly 12 are constrained by a spindle-coupled road test simulation machine (not illustrated), which stops hubs 28 from freely rotating. Notwithstanding, the resistance provided by the constrained hubs 28 allow the input assembly 64 to generate axle twist loads within the suspension system 13 and axle tubes 26 when the torsional load is input to the axle assembly 12 that may be monitored by angular displacement transducer 68 and torsional load cell 72 that communicate with controller 76. Thus, as rotary actuator 70 inputs rotary loads to axle assembly 12, signals that are indicative of the angular displacement and the torsional load experienced by axle assembly 12 may be communicated by angular displacement transducer 68 and torsional load cell 72, respectively, to controller 76 to monitor the rotational torque applied to axle assembly 12 by input assembly 64.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A road simulation test system for testing torsional strain input to an axle assembly having a rotational input and a suspension system, the road simulation test system comprising:
    a support structure for suspending the axle assembly;
    a torque input module suspended by the support structure and configured to apply rotary torque to the axle assembly through the rotational input, the torque input module including a rotary actuator, a torsional load cell, a drive shaft connection portion, and a controller in communication with the rotary actuator and the torsional load cell,
    wherein upon receipt of an instruction from the controller, the rotary actuator is configured to rotate the rotational input to apply the rotary torque to the axle assembly,
    as the rotary actuator rotates the rotational input, a signal indicative of a torsional load is communicated by the torsional load cell to the controller to monitor the rotary torque applied to the axle assembly, and
    the axle assembly is not part of a vehicle while suspended from the support structure.

2. The test system according to claim 1, wherein the torque input module further includes an angular displacement transducer attached to the rotary actuator and in communication with the controller, the angular displacement transducer configured to transmit a signal indicative of an angular displacement applied to the rotational input of the axle assembly.

3. The test system according to claim 1, wherein the drive shaft connection portion includes a drive shaft having a proximate end attached to the rotary actuator, and a distal end attached to the rotational input of the axle assembly.

4. The test system according to claim 3, wherein the drive shaft includes a first section attached to the rotary actuator and a second section attached to the rotational input, the first section and second section being telescopically movable relative to each other.

5. The test system according to claim 4, wherein the first section and second section each include a plurality of axially extending splines that are configured to mate with each other to ensure rotation of the drive shaft when the first and second sections are mated to each other.

6. The test system according to claim 4, wherein the rotary actuator includes a spindle that is attached to a recess formed in a first end of the torsional load cell that is configured for receipt of the spindle, and the first section of the drive shaft is attached to a second end of the torsional load cell.

7. The test system according to claim 1, wherein the support structure includes a plurality of stanchions that support a backbone, and the axle assembly and the torque input module are attached to the backbone.

8. The test system according to claim 7, wherein the support structure includes a support jig that attaches the axle assembly to the backbone, and the support jig includes a plurality of couplings that attach components of the suspension system to the support jig.

9. The test system according to claim 7, wherein the support structure includes a support truss that attaches the torque input module to the backbone.

10. The test system according to claim 9, wherein the torque input module is attached to a mounting frame that is attached to the support truss.

11. A method for testing torsional strain input to an axle assembly having a rotational input and a suspension system, comprising:

suspending the axle assembly from a support structure;

applying rotary torque to the axle assembly using a torque input module connected to the support structure, the torque input module including a rotary actuator, a torsional load cell, and a drive shaft connection portion, and the rotary actuator rotating the rotational input to apply the rotary torque to the axle assembly;

monitoring a torsional load applied to the axle assembly with the torsional load cell; and monitoring an angular displacement applied to the rotational input of the axle assembly using an angular displacement transducer that is part of the torque input module, wherein the axle assembly is not part of a vehicle while suspended from the support structure.

12. The method according to claim 11, wherein the support structure includes a backbone and a support jig that attaches the axle assembly to the backbone, and the method further comprises attaching components of the suspension system to the support jig.

13. The method according to claim 11, wherein the drive shaft connection portion includes a drive shaft having a proximate end attached to the rotary actuator, and a distal end attached to the rotational input of the axle assembly.

14. The method according to claim 13, wherein the drive shaft includes a first section attached to the rotary actuator and a second section attached to the rotational input, the first section and second section being telescopically movable relative to each other.

15. The method according to claim 14, wherein the first section and second section each include a plurality of axially extending splines that are configured to mate with each other to ensure rotation of the drive shaft when the first and second sections are mated to each other.

* * * * *